Dec. 23, 1969    H. FÜHRING ET AL    3,484,884
APPARATUS FOR WASHING VEHICLES
Filed Nov. 28, 1967    2 Sheets-Sheet 1
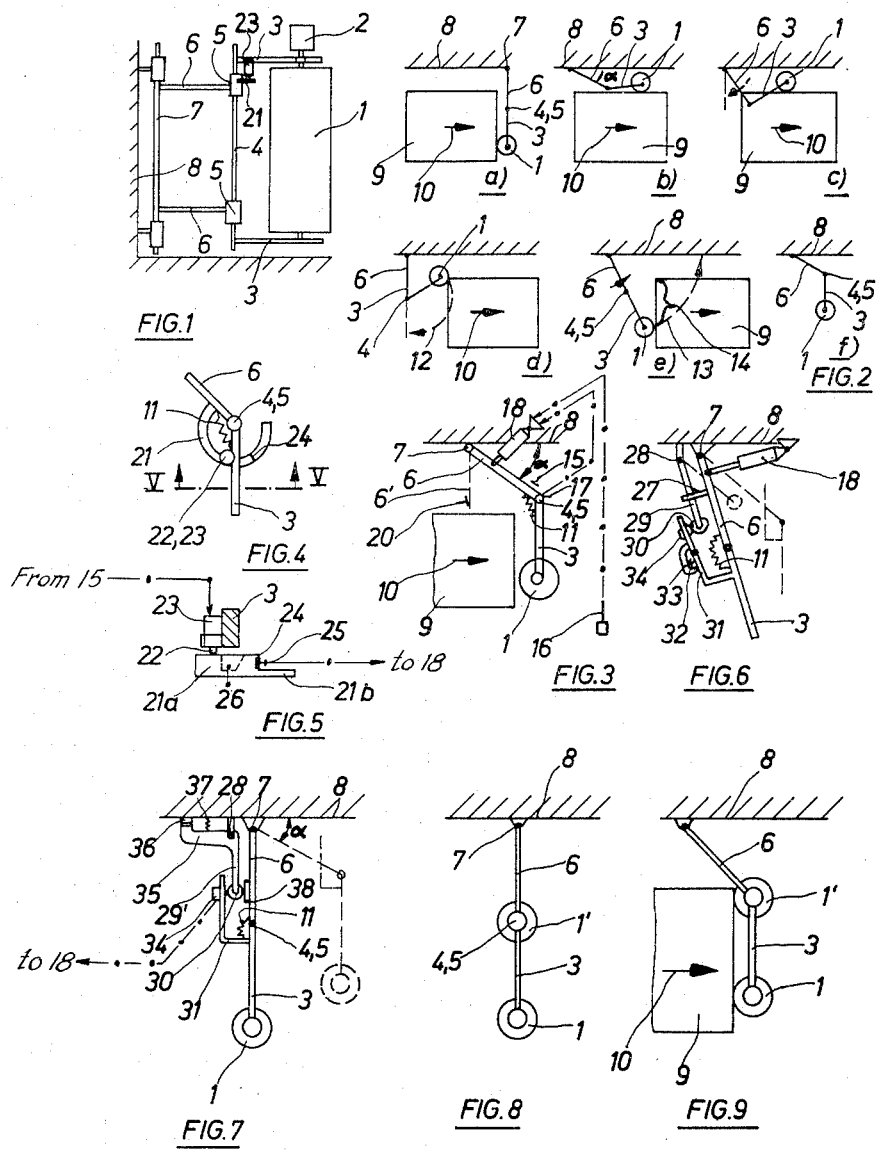
Heinrich FÜHRING
Richard FLESCHHUT
INVENTORS
BY Karl F. Ross
Attorney

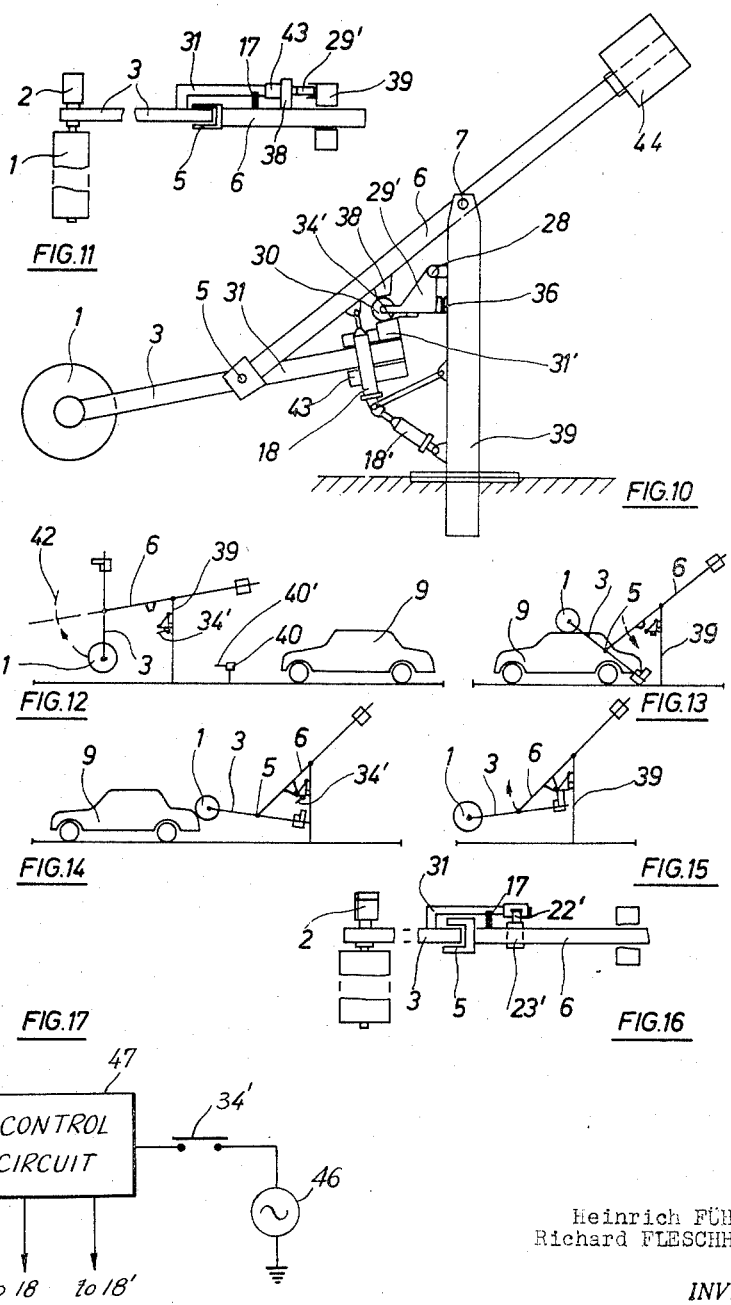

United States Patent Office 3,484,884
Patented Dec. 23, 1969

3,484,884
APPARATUS FOR WASHING VEHICLES
Heinrich Führing, Augsburg, and Richard Fleschhut, Goggingen, Germany, assignors to Bowe Bohler & Weber KG, Maschinenfabrik, Augsburg, Germany, a corporation of Germany
Filed Nov. 28, 1967, Ser. No. 686,025
Claims priority, application Germany, Dec. 2, 1966, B 90,109; July 26, 1967, B 93,666
Int. Cl. B60s 3/06
U.S. Cl. 15—21
11 Claims

ABSTRACT OF THE DISCLOSURE

An articulated linkage swingable in a horizontal or vertical plane carries a car-washing brush 1 rotatable about an axis perpendicular to that plane; the linkage consists of a first arm (or pair of arms) 6, having a fixed fulcrum, and a second arm (or pair of arms) 3 supporting the brush. From a starting position in which at least the second arm extends generally transversely into the path of a vehicle to be washed, as the vehicle moves past, the first arm 6 is swung rearwardly (i.e. against the direction of vehicle motion) into an extended position, this being followed by a relative rearward rotation of the second arm 3 under its own weight or the force of a biasing spring 11 as soon as that arm slides off the side or upper surface of the vehicle swept by its brush. The two arms then interlock in an aligned or other predetermined relative position whereupon the swing of the first arm 6 is reversed to make the brush follow the vehicle while wiping its rear surface. After a forward swing of the locked arms into a deflected position, the interlock is released to let the second arm 3 resume its generally transverse starting position with the brush located substantially at or beyond the centerline of the vehicle path.

---

In our copending application Ser. No. 602,064, filed Dec. 15, 1966, we have disclosed a car-washing installation with an articulated linkage pivotally mounted on a supporting structure for rotation in a horizontal or vertical plane, the linkage including a first arm fulcrumed on the supporting structure and a second arm hinged to the first arm while carrying on its free end a brush rotatable about an axis perpendicular to the swing plane of the arms. With the junction of the arms initially positioned substantially along the centerline of the path of a vehicle moving relatively to the supporting structure, another brush parallel thereto is mounted at that junction to help deflect the first arm from the vehicular path by contacting the front surface of an approaching vehicle whereby first a major part of this front surface and then the entire side surface of the vehicle is washed by the two brushes. As the vehicle breaks contact with the second brush, the first arm swings back toward the center of the path in the wake of the receding vehicle whereupon the first brush is swept across part of the rear surface of the vehicle by a return swing of the second arm.

In the system according to our present invention, in which the second brush may be omitted, we provide for a more effective sweeping of the rear surface of the vehicle by interlocking the two arms in a mutually aligned or other predetermined relative angular position thereof after the brush at the free end of the second arm has slid off the side of the passing vehicle, this second arm being then urged toward the interlocking position by a biasing force supplied by a spring or, if the swing plane is vertical, by the weight of the brush. The two interlocked arms are then swung forwardly, i.e. in the direction of relative vehicular motion, by an actuator such as a pneumatic jack engaging the first arm; when this arm has reached a deflected position out of the path of the vehicle, i.e. a position in which its angle of inclination relative to that path is substantially less than in the extended position during which interlock occurs, the arms are again unlocked by release means which may comprise a switch closed by the first arm in its deflected position or a mechanical arrangement whereby an escapement member, jointly engaged by the two arms in their interlocked position, is disengaged therefrom at the end of the forward swing. Upon the release of the hinge lock, the aforementioned biasing force is free to re-extend the second arm generally transversely into the vehicular path, to or beyond its centerline, preparatorily to the start of a new washing operation.

The invention relates to an apparatus for washing vehicles, in which at least one brush mounted on a pivotal linkage is moved by a vehicle, moving relative to the pivotal point, from a resting position to be thereafter guided along the front surface and then a side or top surface of the vehicle.

A variety of arrangements are known for washing vehicles by means of such brushes that are swingably mounted on a pivoted support. These known systems, however, have the disadvantage that they allow the washing of only the front surface and a side of a vehicle moving past them on a track, whereas the rear surface is not reached by the brush. Hitherto special additional brush-swinging devices were provided for washing the rear surface of the vehicle.

The object of the invention therefore is to provide a system in which not only the front and sides but also the rear surface of a vehicle moving past can be washed in a simple manner, by means of a single pivotal brush mounting.

The invention will now be described further, by way of example, with reference to the accompanying drawing in which:

FIG. 1 is an example of a pivotal mounting, comprising hingedly interconnected supporting arms, for a brush adapted to be rotated about a vertical axis;

FIG. 2 is a series of schematic views of several successive phases of operation of the assembly shown in FIG. 1;

FIG. 3 is a plan view of an apparatus in accordance with the invention;

FIG. 4 is a plan view of a hinge stop for the apparatus of FIG. 3;

FIG. 5 is an enlarged sectional view on the line V—V of FIG. 4;

FIGS. 6 and 7 are plan views, similar to FIG. 3, of an alternative embodiment of the apparatus in accordance with the invention shown in two different operating positions;

FIGS. 8 and 9 are similar plan views of a further embodiment having two brushes;

FIG. 10 is a side view of an arrangement having one brush adapted to be rotated about a horizontal axis;

FIG. 11 is a plan view of the apparatus of FIG. 10;

FIGS. 12 to 15 are diagrammatic views illustrating various successive positions of the apparatus of FIG. 10 during the washing process;

FIG. 16 is a further view similar to FIG. 3, illustrating another modification and FIG. 17 is a circuit diagram.

FIG. 1 shows schematically an apparatus comprising two pairs of hingedly interconnected supporting arms 3 and 6 constituting an articulated linkage. A brush 1 is rotatable about a vertical axis and is driven by a motor 2; it is mounted at its upper and lower ends on arms 3, each of which is connected with a respective arm 6 by means of a sleeve 5 rotatable on a shaft 4. Arms 6 are pivotable about a fixed fulcrum constituted by the axis of a shaft 7 which is similarly connected with a wall 8 of a supporting structure. In a simplified system, as shown in FIG. 11 or 16, the brush 1 is mounted by one (e.g. upper) end on one supporting arm 3, the pivot at the other (e.g. lower) end of the brush being omitted; the following description of FIG. 2 is to be read with this modification in mind.

FIG. 2 shows by means of several views a) to f) successive phases of operation of the apparatus of FIG. 1. A vehicle 9 which is advanced in the direction of the arrow 10 encounters with its front surface the brush 1 which is situated in a normal position shown in FIG. 2, view a). Progressive advance of the vehicle 9 in the direction 10 causes the brush 1 to be swung out sideways so that the main brush support 6 and its pivotal extension 3 assume positions as shown in FIG. 2, view b). The supports 3 and 6, either by limitation of the movement at the pivot 5 or by means of a spring 11 (FIGS. 3 and 4) interconnecting these supports, are swung sideways as shown in FIG. 2, view b) the support 6 may also be retained at a predetermined angle of inclination α relative to the direction 10 of movement of the vehicle, or relative to the wall 8, by a stop whilst the support 3 is swung progressively. During displacement of the vehicle 9 in the direction 10, the brush 1 moves along the side of the vehicle in the swung-out position shown.

After the vehicle 9 has advanced relative to the apparatus 1, 3, 6 in the direction 10 through a certain distance, as shown in FIG. 2 view c), the main support 6 is rotated clockwise so as to move against the direction of vehicle movement from the position of view b), including the angle α with direction 10 into a limiting position in which it includes an angle of 90° or less with that direction. This pivotal movement may be trigged by a switch or the contacted by the supports during their pivotal movement, e.g. as illustrated at 17, 18 in FIG. 3 and described below.

During progressive advance of the vehicle 9 the brush finally slips off the side. The support 3, as shown in FIG. 2, view d) is pivoted clockwise about its fulcrum 4 until the two supports 3 and 6 assume an aligned or substantially aligned position. As shown by the broken arrow 12, the brush 1 moves over part of the rear surface of the vehicle 9 and washes it.

As soon as the supports 3 and 6 have reached this aligned or substantially aligned position, a stop to be described hereinafter, with reference to FIG. 4, releably locks the joint 5. A force acting on the main support 6 such as that of a jack shown at 18 in FIG. 3, then swings both supports together, as shown in FIG. 2, view e), counterclockwise against the rear surface of the receding vehicle 9. Brush 1 on bearing upon the rear surface of the car and washing it, moves in the direction of the broken arrow 13. This follow-up pivotal movement of the aligned supports sweeps all or at least a major part of the rear surface of the vehicle depending upon the effective length of the support. The distance 14, FIG. 2, view e) represents the width of the rear surface wiped by the brush 1. Since in a vehicle-washing installation an apparatus of the kind described is generally arranged on each side of the vehicle, it suffices if more than half the rear surface to be washed can be reached by each of these devices.

The joint counterclockwise rotation of the two arms 3 and 6 as shown in view e) of FIG. 2 may be such that the brush 1 is able to sweep over the whole of the rear surface to the outer edge of the vehicle remote from the wall 8. From the end position reached, the apparatus can be returned into the original position as shown in view a) of FIG. 2, by unlocking the joint 5, for the purpose of washing a further vehicle. We prefer, however, to retain the main support 6 in the terminal position of its counterclockwise swing and, upon the unlocking of joint 5, to move only the brush support 3 by means of a suitable restoring force, e.g. that of a spring into the normal or starting position shown in view f) of FIG. 2. When proceeding from such a normal position, the apparatus is more speedily operable, as compared with a transversely extended initial position as shown in view a) which requires two further reversals of rotation of arm 6 to establish the position of view b). On the other hand, the position of view a) places the brush 1 beyond the centerline of the vehicular path so that a larger part of the front surface of car 9 is wiped by it than from the starting position of view f) where, with arm 6 aready deflected toward the side, brush 1 lies just at the centerline.

It is evident that the follow-up pivoting need not necessarily be carried out in a completely aligned state of the two supports 3 and 6, but that the two supports may also include an obtuse angle with each other.

At the beginning of the follow-up pivoting movement the main support 6 may be situated in one of the end positions in which it includes an acute angle with the direction 10 of vehicle movement.

FIG. 2 has been treated above as a set of plan views, but it may just as readily be considered a series of side views of an apparatus having a brush rotatable about a horizontal axis. In such a case, the aforementioned restoring spring (shown at 11 in subsequent figures) may be replaced by gravity. The apparatus is therefore not limited to an arrangement with vertical brushes.

FIG. 3 and the following figures show a variety of possible modifications of the apparatus in accordance with the invention. As shown in FIG. 3, the vehicle 9 swings the brush support 3 outwards against the force of spring 11, whilst the main support 6 in one end position is held by a stop 15 at an angle α relative to the direction 10 of vehicle movement or the wall 8. When the advancing vehicle 9 has engaged a contact arm or feeler 16, or when the extended brush support 3 has tripped a contact arm 17 in the region of the joint 4, upon its alignment with arm 6 or possibly a certain safety period later, the circuit of a jack 18 is tripped by a switch controlled by that contact as diagrammatically shown in FIG. 3.

As soon as the brush support 3, as already described in connection with view d) of FIG. 2, is swung counterclockwise about fulcrum 4 by spring 11, a locking mechanism in the region of the joint 5 becomes effective to prevent further pivotal movement in this direction. For this purpose, as shown in FIGS. 4 and 5, a stop bar 21 is secured to one of the supports, such as the main support 6, to form a track for a latch 22 connected with the brush support 3. The latch 22 is conveniently formed as an armature of an electromagnet 23 mounted on the brush support 3 or adapted to be actuated by means of such an armature. As long as the brush support 3 rides on the raised portion 21a of the stop bar 21, and when the electromagnet 23 is excited, the joint 5 is not latched. When the main support 6 is swung by the jack 18 in a clockwise direction, and while the brush 1 still abuts the side or top surface of the vehicle, the armature of the deenergized electromagnet 23 forming the latch 22 rests on the reduced portion 21b of the stop bar 21. Upon the aforementioned swing of the brush support 3 into its extended position, the latch 22 strikes a shoulder 24 of the stop bar 21, locking the brush support against further pivotal movement in a direction opposite the vehicle movement. Abutment 24 carries a switch contact 25 which, when the latch 22 strikes this shoulder, reverses the jack 18 (as indicated diagrammatically in FIG. 5) to swing the main support 6 back into an alternate limiting position, the brush being thereby swung against the rear surface of the vehicle. The reversal of the jack 18 or the beginning of the swinging movement of the main support 6 from the end position 6 into its other end position (angle α) may also be effected, in the same way as the pivotal movement in the opposite direction, by means of feelers or contact arms similar to switch contact 16.

The pivotal movement is terminated when the main support 6 strikes the stop 15. This stop is connected to the contact arm of a limit switch by means of which the electromagnet 23 is briefly excited, so that it attracts its armature 22, causing the joint 5 to be unlatched and the brush support 3, biased by the spring 11, to be swung back into its original position as shown in FIG. 3. The position of the supports 3 and 6 during the pivotal movement against th rear surface of the vehicle is determined by the position of the abutment 24 on the stop bar 21. The stop bar 21 may, if necessary, have further recesses 26, indicated in FIG. 5 only by dotted lines, in order to permit the brush support 3 to be locked in various positions relative to the main support 6.

FIGS. 6 and 7 show further embodiments of the apparatus in accordance with the invention. Here the swing lock is controlled by means of an escapement mechanism, including a rod 29 engaging the main support 6, which is slidable mounted thereon in a rest 27 and pivotable about an axis 28 parallel to the swing axis 7 of arm 6, the rod 29 carrying a roller 30 on its free end. An elbow-shaped extension 31 of the brush support 3, projecting in the illustrated embodiment beyond the joint 4, 5, engages the roller 30 in the end position of the main support 6 in which the two supports 3 and 6 have assumed a predetermined relative angular position, thereby preventing any further relative rotation of the brush support 3 about the joint 5 in a direction opposite the direction of vehicle movement. When the main support 6 is swung by the jack 18 counterclockwise about the axis 7, the rod 29 is rotated about the axis 28 so that the elbow 31 of the brush support 3, after progressive pivotal movement, gradually slips off the roller 30. This also permits the brush support 3 to be swung into the position shown in dotted lines in FIG. 6, by the spring 11 or by gravity which, as already described above, is the original position of the apparatus before arrival of a vehicle.

The roller-engaging extremity 33 of the elbow 31, as shown in FIG. 6, may be designed as a pawl which is slightly pivotable to one side against the force of a spring 32, i.e. clockwise to escape from the roller 30, thereby enabling the brush support 3 to swing with reference to the main support 6 when the end of part 31 strikes that roller from the opposite side. Pawl 33 may be provided with a limit switch 34 by means of which, in the position of the supports 3, 6 shown in FIG. 6 or 7, the action of jack 18 may be reversed to initiate the follow-up pivotal movement. Pawl 33 is of course offset from the plane of moving of arms 8 and 6, lying here at such a low level as to clear the main support 6 when moving past it. The roller 30 extends correspondingly far downwardly, i.e. in a direction transverse to the plane of the drawing.

In the embodiment of FIG. 7 the escapement member is a rod 29' with an extension 35 bearing upon a fixed stop 36. The main support 6 has a rest in the form of a transverse lug 38 (best seen in FIG. 11) through which it bears upon the rod 29. When the main support 6 is swung counterclockwise by the jack 18 (not shown in this figure), as indicated at the top in view e) of FIG. 2, about the axis 7, the rod 29' is first pivotally entrained about its axis 28 until finally sliding off the parts 38 and 31 whereupon through the force of the spring 11 (or by gravity in the case of a vertical serving plane) arm 3 is pivoted clockwise about the joint 5 until finally the position shown in dotted lines in FIG. 7 is reached. After the parts 31 and 38 have detached themselves from roller 30, and 29' is returned by a spring 37 into its original position and urged once more against the stop 36 so that later on the brush support 3 with elbow 31 will clear the roller 30 as the arm 6 swings in the reverse direction is digrammatically illustrtaed in view c) of FIG. 2. A limit switch 34 may again be provided on the elbow 31 for initiating the follow-up pivotal movement of view e) of FIG. 2. The described mode of operation of the apparatus is based on the fact that, owing to the selection of the position of the pivotal axis 28 of the rod 29', the end of the rod engaging the arm 6, i.e. the roller 30, approaches the pivotal axis 7 of that arm when the aligned units 3, 6 swing in the direction 10 of vehicle motion.

FIGS. 8 and 9 show a modification in which, apart from the brush 1, a further, axially parallel brush 1' is provided on the end of the hinged brush support 3 in the region of the joint 5 or in its immediate proximity on one of the two supports 3, 6 the brush assembly being thus similar to that of our copending application Ser. No. 602,064. In such an arrangement the support 6 is laterally deflected by a vehicle 9 advancing in the direction 10, owing to the second brush 1', without requiring the intervention of jack 18 as described above. In order to wash the rear surface of the vehicle a jack 18 or equivalent actuating means and a releasable lock for the joint 5, as shown in FIGS. 4 and 5 or 6 and 7, are also required in this case to extend the arm 6 and to swing the interlocked arms forwardly.

As already mentioned, the brush axis and the pivotal axes may also extend in a horizontal direction. Examples of such an arrangement are shown in FIGS. 10 et seq. There the brush 1 is mounted rotatably about a horizontal axis on the brush support 3, which in turn is secured to the main support 6 by the joint 5 so as to be also pivotable about a horizontal axis. The main support 6 is fulcrumed on a post 39 for rotation about the horizontal axis 7. The post 39 could be replaced by a holder secured to the ceiling of a room.

The system of FIG. 10 comprises the same elements as those of the preceding figures. The swing lock and its control means are constructed as described with reference to FIGS. 6 and 7, so that the parts corresponding to these earlier figures have been given the same reference numerals. Since in the modifications of FIGS. 10 et seq. gravity is used besides other possible sources of force for the pivoting movement of the supports, the parts of the supports extended rearwardly beyond the joints are provided with counterweight 43 or 44. For the sake of completeness the mode of operation of this apparatus is once more exemplified in FIGS. 12 to 15.

In the original position, as shown in FIG. 12, a vehicle 9 coming from the right first pivots the brush support 3 upwardly as shown by the dotted line arrow 42, whilst the main support 6 is retained in an upper binding position by a pair of jacks 18, 18' (FIG. 10). The brush-driving motor 2 (FIGS. 11 or 16) is switched on by contact of the vehicle 9 with the feeler 40' of a switch 40.

During the upward pivotal movement of the brush support 3, as shown by the arrow 42, this support engages the contact arm 17 of a switch connected to the main support 6 (FIGS. 11 and 16), whereupon the jacks 18, 18' are actuated and the main support 6 is moved downwardly in the direction of the arrow of FIG. 13 into that end position in which it includes the largest angle with the direct of vehicle movement. In this position the elbow 31 and the rest 38 bracket the roller 30 of the rod 29' which is pivotally mounted on the post 39 at 28 and bears upon the stop 36 (FIG. 10).

During progressive advancement of the vehicle 9, the brush 1 slides down over the rear surface thereof (FIG. 14). As soon as the brush 1 drops off the vehicle surface, the roller-engaging portion 31 of its support 3, projecting beyond the joint 5, strikes with a lug 31' from below against the roller 30 (FIGS. 10 and 11). A contact arm 34' of a limit switch is thereby actuated to turn on the compressed-air supply for the jacks 18, 18' so as to cause them to swing the main support 6 clockwise, together with the brush support 3 locked thereto, thereby displacing the brush 1 generally in the direction of vehicle movement (FIG. 15) so as to wash the rear surface of the gradually receding vehicle. Owing to the action of the escapement mechanism described in connection with FIGS. 6 and 7, the brush support 3 finally, at a certain angular position of the main support 6 dependent upon the selection of the pivotal axis and the scanning radius of the rod 29, pivots downwardly in counter-clockwise direction, so that the original position of the apparatus as shown in FIG. 12 is resumed.

As indicated in FIG. 16, the rod arrangement of FIGS. 3 to 5 may be replaced by an electromagnet 23', secured to the main support 6, whose armature 22', with the magnet in a de-energized state, rests against the elbow-shaped extension 31 of the brush support 3, thereby blocking its relative pivotal movement. When the electromagnet 23' is energized by arrangement of the main support 6 with a contact arm during its upward showing armature 22' releases the brush support 3 for pivotal downward movement. The energizing current is switched off again by the contact arm 17 when the latter is actuated during the downward movement (FIG. 13) of the main support 6.

For the follow-up pivotal movement shown in FIG. 15 it is not necessary that the brush support 3 and the main support 6 assume a fully aligned position in which the angle included thereby is as illustrated, a lesser obtuse angle will suffice.

Various possibilities exist by means of which the contact arms 17 and 34', in conjunction with suitably arranged limit switches, may actuate or reverse the jack 18 or 18'. In FIG. 17 there is only indicated that the contact arm 34' may be inserted in a lead connected between a common voltage source 46, and a control circuit 47 to trigger the operations upon closure of its contacts.

The invention is therefore not limited to the specific embodiment described and illustrated.

We claim:

1. In a vehicle-washing system comprising a supporting structure, a brush-carrying linkage swingable on said structure in a plane parallel to the path of relative motion of said structure and a vehicle to be washed, and a brush mounted on said linkage for rotation about an axis perpendicular to said plane, said linkage including a first arm pivoted to said structure and a second arm carrying said brush while being articulated to said first arm for relative rotation in said plane, the combination therewith of releasable lock means at the junction of said arms for relatively immobilizing same, said lock means being operative in a predetermined relative angular position of said arms, release means for said lock means effective in a deflected position of said first arm wherein the latter includes a relatively small angle with said path, actuating means for swinging said first arm rearwardly with reference to the direction of vehicular motion into an extended position upon movement of a vehicle past said structure, said first arm including a relatively large angle with said path in said extended position, said second arm being under a biasing force urging same toward the center of said path and said relative angular position whereby said brush sweeps a lateral surface of the passing vehicle and swings out into said path upon sliding off said lateral surface with consequent interlocking of said arms, and control means triggerable by said linkage in said relative angular position of said arms for reversing said actuating means with resulting forward swing of the interlocked arms and wiping of at least part of the rear surface of the receding vehicle by said brush until said first arm reaches said deflected position to render said release means effective, thereby enabling said biasing force to extend said second arm generally perpendicularly into said path independently of said first arm.

2. The combination defined in claim 1 wherein said arms include with each other an angle of at least 90° in said relative angular position.

3. The combination defined in claim 1 wherein said biasing force is provided by a spring connected to both said arms.

4. The combination defined in claim 1 wherein said plane is vertical, said biasing force being provided by the weight of said brush.

5. The combination defined in claim 1 wherein said lock means comprises an electromagnetically retractable latch.

6. The combination defined in claim 5 wherein said latch is mounted on one of said arms, the other of said arms being provided with an arcuate track for said latch formed with an abutment engaging said latch in said relative angular position.

7. The combination defined in claim 1 wherein said lock means comprises an escapement member engageable with both said arms, said release means comprising a pivotal mounting for said member on said structure with a fulcrum offset from that of said linkage, said second arm having an extension coacting with a free end of said member for joint swinging of said member together with said arms between the extended and the deflected position of said first arm.

8. The combination defined in claim 7 wherein said member is provided with a roller on its free end, said first arm forming a rest for said roller, said extension being an elbow holding said roller bracketed between itself and said rest in its engaged position.

9. The combination defined in claim 8 wherein said elbow is provided with a limitedly unidirectionally swingable pawl forming a roller-engaging extremity thereof.

10. The combination defined in claim 1 wherein said control means comprises a switch element on one of said arms triggerable by said lock means.

11. The combination defined in claim 1 wherein said actuating means comprises switch means disposed along said path for operation by said vehicle.

References Cited

UNITED STATES PATENTS 3,350,733   11/1967   Hanna.

FOREIGN PATENTS 1,196,147   5/1959   France.
1,465,327   11/1966   France.

EDWARD L. ROBERTS, Primary Examiner